United States Patent
Martin et al.

(10) Patent No.: US 9,211,492 B2
(45) Date of Patent: Dec. 15, 2015

(54) DUCT WITH CONTAMINANT SEPARATING BARRIER

(71) Applicant: FORD GLOBAL TECHNOLOGIES, LLC, Dearborn, MI (US)

(72) Inventors: Scott James Martin, Canvey Island (GB); Darren John Wood, Canvey Island (GB)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 13/785,826

(22) Filed: Mar. 5, 2013

(65) Prior Publication Data
US 2013/0232930 A1    Sep. 12, 2013

(30) Foreign Application Priority Data
Mar. 6, 2012   (GB) .................................. 1203929.3

(51) Int. Cl.
*B01D 45/08* (2006.01)
*C04B 41/00* (2006.01)
*C04B 38/00* (2006.01)
*F01M 13/04* (2006.01)

(52) U.S. Cl.
CPC ............ *B01D 45/08* (2013.01); *C04B 38/0006* (2013.01); *C04B 41/009* (2013.01); *F01M 13/04* (2013.01); *F01M 2013/0433* (2013.01)

(58) Field of Classification Search
CPC .. B01D 45/08; C04B 41/009; C04B 38/0006; F01M 13/04; F01M 2013/0433
USPC .......................... 55/462, 464, 385.3, 465, 466
See application file for complete search history.

(56) References Cited

U.S. PATENT DOCUMENTS

| | | | | |
|---|---|---|---|---|
| 2,538,195 A | * | 1/1951 | Henkel | 55/450 |
| 2,614,654 A | * | 10/1952 | Strinden | 454/158 |
| 5,494,497 A | * | 2/1996 | Lee | 55/480 |
| 5,913,295 A | * | 6/1999 | Sadr et al. | 123/198 E |
| 7,266,958 B2 | * | 9/2007 | Milde et al. | 62/150 |
| 2006/0021356 A1 | * | 2/2006 | Milde et al. | 62/93 |
| 2008/0127949 A1 | * | 6/2008 | Herald et al. | 123/519 |

FOREIGN PATENT DOCUMENTS

| | | |
|---|---|---|
| DE | 10200673 A1 | 7/2003 |
| JP | 2011012609 A | 1/2011 |
| KR | 100870911 B1 | 11/2008 |

OTHER PUBLICATIONS

European Patent Office, Search Report for the corresponding GB Patent Application No. GB 1203929.3 mailed Jun. 18, 2012.

* cited by examiner

*Primary Examiner* — Dung H Bui
(74) *Attorney, Agent, or Firm* — Greg P. Brown; Brooks Kushman P.C.

(57) ABSTRACT

A conduit carrying gaseous matter has a device inside it forming a low-lying sump for separating and collecting non-gaseous matter. The device fits within a flexible section of the conduit and includes a barrier plate oriented generally horizontally to longitudinally divide a length of the conduit into a gas-carrying passageway (above the barrier plate and a sump (below the barrier plate, a spacer extending from a lower surface of the barrier plate, and first and second frame members extending from an upper surface of the barrier plate at spaced-apart locations. The spacer and the frame member contact inner surfaces of the conduit to positively position the barrier plate within the conduit, and the frame members are oriented obliquely to one another to urge the flexible section of the conduit into a bent shape having a lowest portion defining the sump.

14 Claims, 3 Drawing Sheets

DUCT WITH CONTAMINANT SEPARATING BARRIER

CROSS-REFERENCE TO RELATED APPLICATIONS

This application claims foreign priority benefits under 35 U.S.C. §119(a)-(d) to GB 1203929.3, filed Mar. 6, 2012, which is hereby incorporated by reference in its entirety.

TECHNICAL FIELD

The present invention relates to conduits and devices provided within conduits to collect, or act as a barrier against, an unwanted solid or liquid matter travelling along the conduit. In particular, but not exclusively, the invention relates to devices which can be retro-fitted within an engine air inlet duct of a vehicle to prevent or inhibit ice reaching a downstream component such as a turbocharger.

BACKGROUND

In a vehicle engine, a small amount of unburned fuel and exhaust gases will escape around the piston rings during combustion and enter the crankcase. The fuel and gases are referred to as blow-by gas and the vehicle includes a crankcase ventilation system to deal with the blow-by gas. To reduce emissions to the atmosphere, the blow-by gas is typically recycled back into the combustion chamber of the engine. This is done by mixing the blow-by gas with intake air, upstream of the turbocharger if the engine includes this. The blow-by gas, and thus the mix of blow-by gas and intake air, contains oil from the crankcase. The intake air can contain moisture, snow and the like, depending on the environmental conditions.

An oil and water separator is often present upstream of the turbocharger to reduce the amount of water and oil present in the air flowing towards the combustion chamber. Nevertheless, even if a separator is used, the blow-by gas can contain water which can freeze to ice if the vehicle is in a cold environment. This ice can hinder air flow in the ducting or form pieces of ice chunks which can cause damage to components, such as the compressor vanes of the turbocharger. The forming of ice can occur while the engine is switched off or idling.

A sump may be provided in the air ducting and ice can form here when oil vapour enters the ducting and encounters the cold air stream. Since the water/ice has an oil content, and the ducting has an oil coating, the ice tends not to adhere to the inner surface of the ducting and is therefore drawn into the turbocharger, particularly during high acceleration.

It is desirable to provide improved means of inhibiting the formation of ice and/or inhibiting the formed ice from flowing downstream, such as to the turbocharger.

SUMMARY

In a first disclosed embodiment, a device is adapted for insertion into a fluid-carrying conduit to form a sump for separating out and trapping non-gaseous matter. The device comprises a barrier plate adapted to longitudinally divide a length of the conduit (thereby defining a passageway for gaseous matter above the barrier plate and a sump for collecting non-gaseous matter below the barrier plate), a spacer extending from a lower surface of the barrier plate and configured to contact a lower inner surface of the conduit below the barrier plate and space the barrier plate from the lower inner surface, and a frame member extending from an upper surface of the barrier plate and configured to contact an upper inner surface of the conduit above the barrier plate. The spacer and the frame member positively position the barrier plate within the conduit to form the sump.

In another disclosed embodiment, a device adapted for insertion into a conduit to form a sump comprises a barrier plate, a spacer extending from a lower surface of the barrier plate, and first and second frame members extending from an upper surface of the barrier plate at spaced-apart locations. The frame members are approximately annular and oriented obliquely to one another, and the spacer and the frame members are configured to contact interior surfaces of the conduit to positively position the barrier plate therein and urge the conduit to a bent condition, In the bent condition, a sump is formed between the lower surface of the barrier plate and the conduit adjacent to the spacer adjacent a lowest portion of the conduit.

In another disclosed embodiment, apparatus for separating non-gaseous matter from gaseous matter comprises a conduit having a flexible section, and a device within the flexible section forming a sump to collect the non-gaseous matter. The device comprises a barrier plate oriented generally horizontally to longitudinally divide a length of the conduit into a passageway (for the gaseous matter) above the barrier plate and a sump (for collecting the non-gaseous matter) below the barrier plate, a spacer extending from a lower surface of the barrier plate and contacting a lower inner surface of the conduit, and first and second frame members extending from an upper surface of the barrier plate at spaced-apart locations to contact an upper inner surface of the conduit above the barrier plate. The spacer and the frame member positively position the barrier plate within the conduit, and the frame members are oriented obliquely to one another to urge the flexible section of the conduit into a bent shape having a lowest portion defining the sump.

BRIEF DESCRIPTION OF THE DRAWINGS

Embodiments of the present invention will now be described, by way of example only, with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
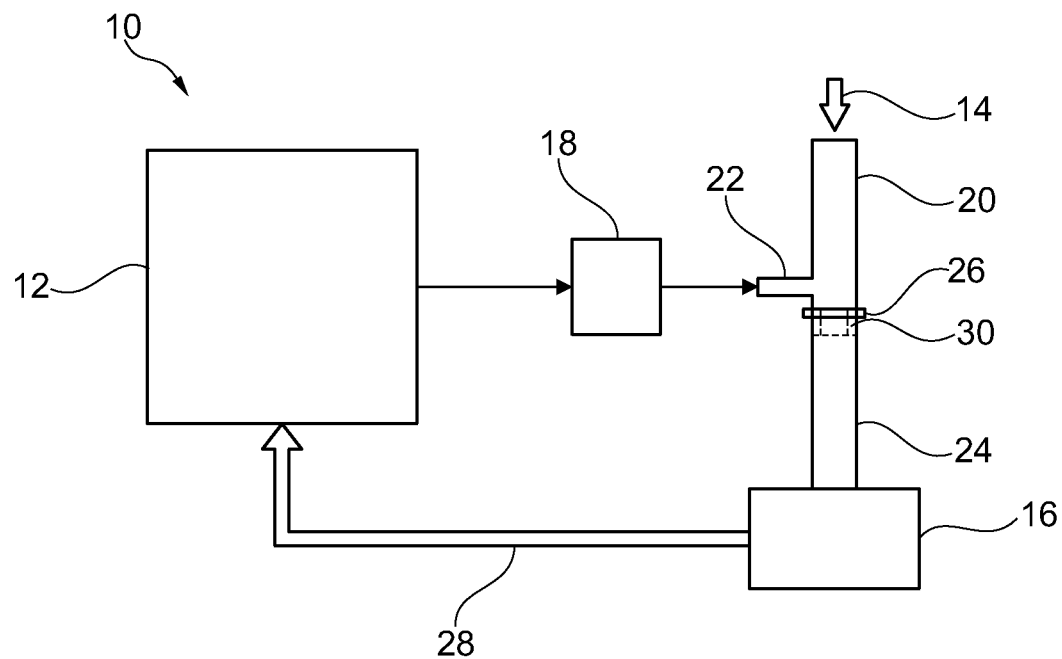
FIG. 1 is a schematic view of an engine system of a vehicle.

FIG. 1 shows an engine system 10 of a vehicle. Blow-by gas in the crankcase of the engine 12 is recycled back to the engine 12 by mixing the blow-by gas with intake air 14 upstream of a turbocharger 16. The blow-by gas may first pass through an oil and water separator 18 before flowing into a first intake air duct 20 via a side port 22. The first intake air duct 20 is connected to a second intake air duct 24 by a clamp connector 26. A device 30 is provided within the second intake air duct 24. The first intake air duct 20 is connected to the turbocharger 16 and a third duct 28 connects the turbocharger 16 to the engine 12. One or more of the ducts 20, 24, 28 may be flexible.

Figure 2:
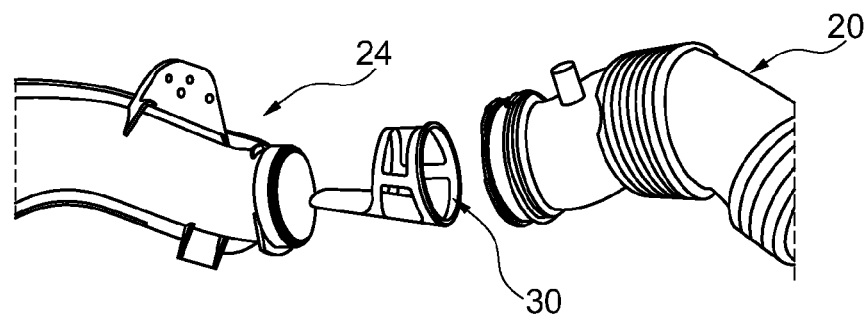
FIG. 2 is a perspective view of a separator device and two conduits.
Figure 3:
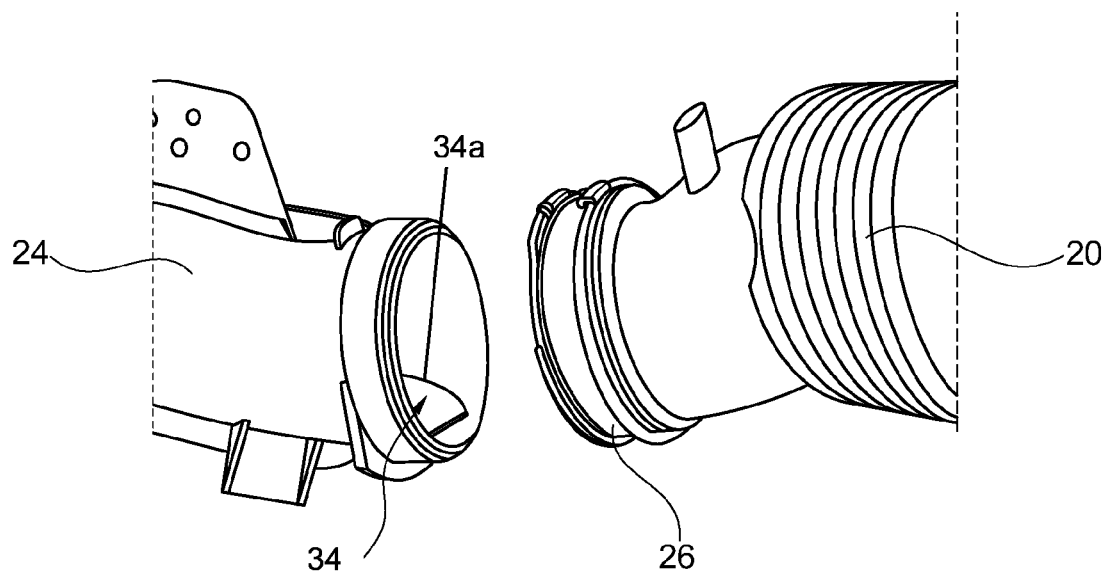
FIG. 3 is a perspective view of the separator device of FIG. 2 inserted within one of the conduits.

FIG. 2 shows the device 30 prior to insertion within the second intake air duct 24. The device 30 includes a stop member or lip 32 for limiting the longitudinal insertion of the device 30. The lip 32 is of sufficiently large radius that it abuts an end of the second intake air duct 24 to prevent further insertion. This is shown in FIG. 3. Then, the device 30 is restrained in its longitudinal position when the second intake air duct 24 is connected to the first intake air duct 20 using the clamp connector 26. The lip 32 may also abut an end of the first intake air duct 20 and/or the clamp connector 26 to prevent longitudinal movement towards the first intake air duct 20.

Figure 6:
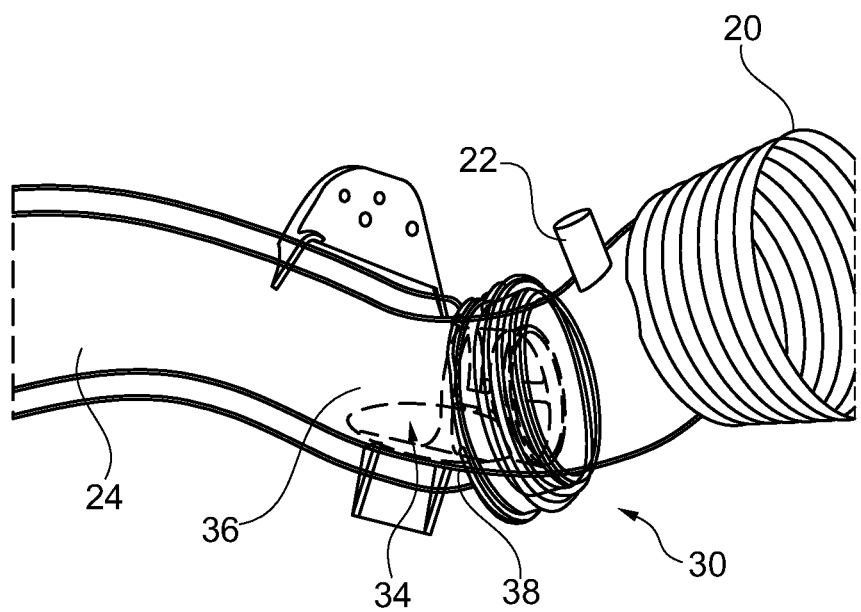
FIG. 6 is a semi-transparent perspective view of the separator device of FIG. 2 fitted within one of the conduits.
Figure 4:
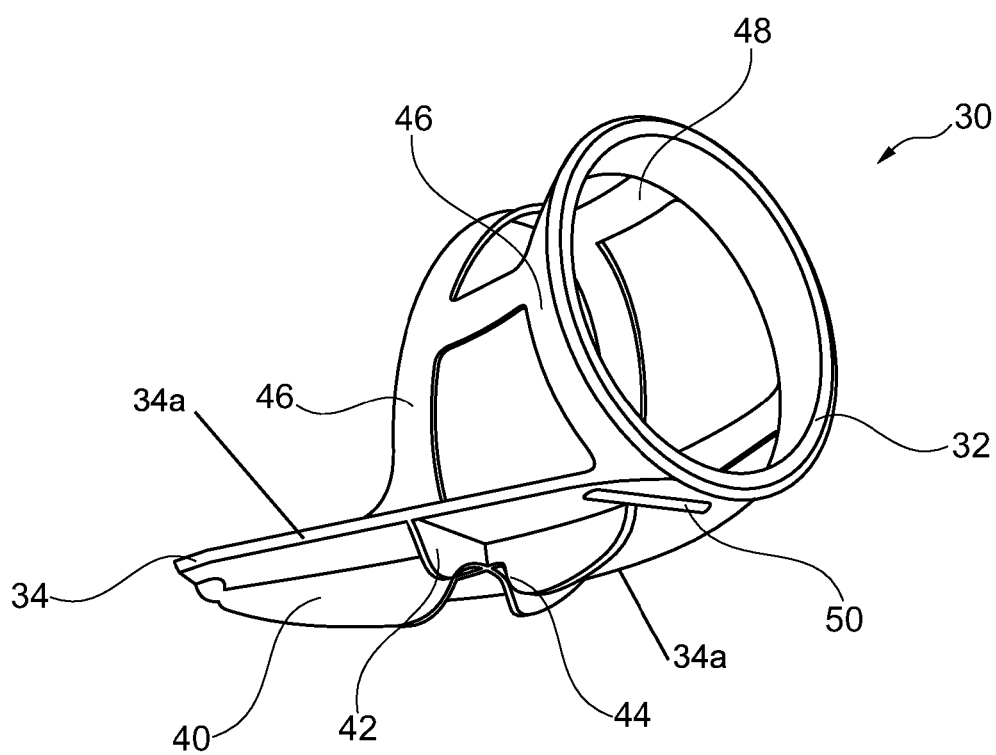
FIG. 4 is another perspective view of the separator device of FIG. 2.
Figure 5:
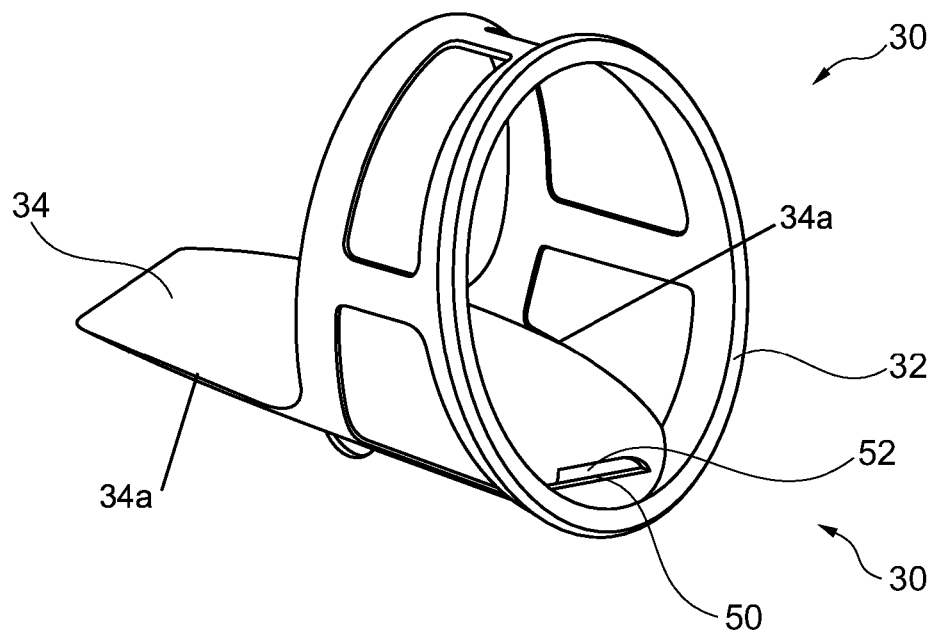
FIG. 5 is another perspective view of the separator device of FIG. 2.

FIGS. 4 and 5 show the device 30 in more detail and FIG. 6 shows the device 30 within the connected ducts. The device 30 may be an injection moulded plastic such as polypropylene.

The device 30 comprises a barrier plate 34 having perimeter edges 34a which, when the device is inserted into the second intake duct 24, are disposed immediately adjacent the inner surface of the duct to longitudinally divide a length of the second intake air duct 24. This installed position of the device 30 (shown in FIGS. 3 and 6) defines a main passageway 36 above barrier plate 34 for the mix of air and blow-by gas and a sump 38 below the barrier plate 34 for unwanted fluid or matter such as snow, ice or water.

As seen best in FIG. 4, the device 30 includes spacers for positioning the barrier plate 34 above a lowest portion of the second intake air duct 24 to define the sump 38. The spacers may comprise a first beam 40 extending in a longitudinal direction and a second beam 42 extending in a lateral direction. Both of the spacer beams 40, 42 may include a recess 44 to allow unwanted fluid or matter to pass from side of the beams to the other. The laterally extending second beam 42 may have an arcuate base surface so as to correspond to the circular inner surface of the conduit. Also, as explained below, the second intake air duct 24 may include a bend at the location of the device 30 and the longitudinally extending first beam 40 may have an arcuate base surface so as to correspond to the arcuate inner surface of the bend.

The support features may also include a contact member in the form of a rigid frame for contacting other portions of the inner surface of the second intake air duct 24. In the depicted embodiment, the frame comprises two approximately annular rings 46, each of which contacts substantially the entire circumference of the inner surface of the conduit at a cross section of the first intake air duct 20. The two rings 46 are spaced apart and may be connected by struts 48. The frame therefore contacts the inner surface of the second intake air duct 24 at two spaced-apart cross sections of the second intake air duct 24. By "approximately annular," it is meant that one or more of the rings 46 may not be perfectly circular, and/or may not form a complete 360° of a circle. For example, the rings 46 may be described as approximately annular although they may not extend below barrier plate 34, as beams 40, 42 may be located there.

The two rings 46 may have rigid walls which are oriented obliquely, rather than parallel, to each other. When the device 30 is positioned within the flexible second intake air duct 24, the obliquely oriented rings 46 impose a bend on the length of second intake air duct 24. The imposed bend is generally U-shaped with the bight of the U downward and so the barrier plate 34 defines the sump 38 at the lowest portion of the U-shaped bend as shown in FIG. 6.

The barrier plate 34 may have an approximately oval perimeter to correspond to the inner surface of the second intake air duct 24 when bent to the U-shape. However, a small clearance may be provided between the barrier plate 34 and the inner surface to allow liquid or solid matter to pass downward into the sump 38.

Also, the barrier plate 34 may include an aperture 50. The aperture 50 may be provided adjacent to a leading portion of the barrier plate 34 with respect to the direction of flow of the air 14 and blow-by gas. A louver 52 may be provided adjacent to the aperture 50 to direct unwanted fluid or matter towards the sump 38.

The under-side of the barrier plate 34 may be formed to be rough to promote the adherence of ice. In contrast, the upper surface of the barrier plate 34 is preferably formed to be smooth to inhibit any build-up of ice on the upper surface. The term "rough" is to be interpreted as having a sufficiently high mechanical roughness suitable to promote adherence of the unwanted matter as will be known to the skilled person. The term "smooth" is to be interpreted as having a sufficiently low mechanical roughness suitable to inhibit adherence of the unwanted matter as will be known to the skilled person.

At least a portion of the barrier plate may comprise a mesh adapted to allow the passage of carried fluid to and from the sump but prevent unwanted matter from exiting the sump. The mesh may be provided at a trailing portion of the barrier plate with respect to the direction of flow of the carried fluid.

Alternatively or in addition, the barrier may include one or more barrier members adapted to allow the passage of carried fluid to and from the sump but prevent unwanted matter from exiting the sump. Each barrier member may comprise a protrusion or tooth. The barrier members may be provided at a trailing portion of the barrier plate with respect to the direction of flow of the carried fluid.

In use, the device 30 can readily be retro-fitted to an existing engine system 10. The first and second intake air ducts are disconnected at the clamp connector 26 and the device 30 is inserted into the second intake air duct 24 until the lip 32 abuts the end of the second intake air duct 24. The first and second intake air ducts are then reconnected which fixes the position of the device 30.

During operation of the engine 12, a mix of air and blow-by gas is drawn along the first and second intake air ducts. Any snow, ice or water present in the mix will tend to fall into the sump 38 where it will be retained. Specifically, ice particles will be small enough to pass through the aperture 50 of the barrier plate 34 but too large to pass through the clearance between the barrier plate 34 and the inner surface of the duct 24.

As the engine warms, heat transferred to the second intake air duct 24 will melt any snow or ice in the sump 38. As a fluid, the water can pass through the clearance thus emptying the sump 38. This is assisted by intake air being directed into the sump 38 to act upon the contents of the sump 38. The intake air is directed first by the bend geometry imposed by the device 30 and then by the position of the aperture 50 at the leading edge of the barrier plate 34 and the louver 52 provided at the aperture 50. The sump 38 has therefore been purged and is available to collect future unwanted matter.

The device is inexpensive to produce and simple to install and can be retro-fitted without any modification to existing components. The device geometry can be adapted to suit any particular size of ducting (which are provided in standard sizes).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
a conduit;
an approximately oval plate within a curved section of the conduit, perimeter edges thereof immediately adjacent inner conduit surfaces to divide flow therethrough into two streams paralleling opposite plate surfaces;
a spacer extending below a lower surface of the plate; and
first and second rings extending from the plate, contacting upper inner conduit surfaces at longitudinally-spaced locations and oriented obliquely to one another to position the plate in the curved section.

2. The apparatus of claim 1, wherein the spacer has an aperture formed therein.

3. The apparatus of claim 1, wherein the plate has an aperture formed therein adjacent to an upstream end thereof with respect to the flow through the conduit, the flow passing through the aperture and along a lower surface of the plate.

4. The apparatus of claim 1, wherein the lower surface of the plate is rough to promote adherence of unwanted matter.

5. The apparatus of claim 1, further comprising a stop member abutting an open end of the conduit to limit longitudinal insertion of the plate into the conduit.

6. A device insertable into a conduit having a curved section, comprising:
a plate having perimeter edges configured to be immediately adjacent inner surfaces of the conduit when the plate is inserted therein;
a spacer extending below a lower surface of the plate; and
first and second frame members extending above an upper surface of the plate at first and second longitudinally-spaced locations, the frame members being approximately annular and lying in respective planes that are angled with respect to one another to match a curvature of the curved section, the spacer and the frame members configured to contact inner surfaces of the conduit to positively position the plate within the curved section of the conduit in a position to divide flow through the conduit into two streams paralleling the upper and lower surfaces of the plate and to form a sump between the lower surface of the plate and a lower inner surface of the conduit adjacent to the spacer.

7. The device of claim 6, wherein the spacer has an aperture formed therein.

8. The device of claim 6, wherein the plate has an aperture adjacent to an upstream end thereof with respect to the flow in the conduit, the flow passing through the aperture and along the lower surface of the plate.

9. The device of claim 6, wherein the plate has an approximately oval perimeter to corresponds to the inner surface of the curved section of the conduit.

10. The device of claim 6, wherein the lower surface of the plate is rough to promote adherence of unwanted matter.

11. The device of claim 6, further comprising a stop member for abutting an open end of the conduit to limit longitudinal insertion of the device into the conduit.

12. Apparatus comprising:
a conduit having a curved section; and
a device within the curved section comprising:
a plate having perimeter edges immediately adjacent inner surfaces of the conduit and oriented to longitudinally divide a length of the conduit into a passageway above the plate and a sump below the plate;
a spacer extending downward from the plate and spacing the plate from a lower inner surface of the conduit at a lowest portion of the curved section defining the sump; and
first and second generally annular frame members extending upward from the plate at longitudinally-spaced locations to contact an upper inner surface of the conduit above the plate, the frame members angled with respect to one another to match a curvature of the curved section, the spacer and the frame member positioning the plate within the curved section.

13. The apparatus of claim 12 wherein the plate has an aperture adjacent to an upstream end thereof with respect to a direction of flow in the conduit.

14. The device of claim 12, further comprising a stop member for abutting an open end of the conduit and limiting longitudinal insertion of the device into the conduit.

* * * * *